United States Patent
Forman et al.

(10) Patent No.: US 8,898,141 B1
(45) Date of Patent: Nov. 25, 2014

(54) SYSTEM AND METHOD FOR INFORMATION MANAGEMENT

(75) Inventors: George Henry Forman, Palo Alto, CA (US); Lada Ariana Adamic, Ann Arbor, MI (US); Eytan Adar, Seattle, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2512 days.

(21) Appl. No.: 11/298,415

(22) Filed: Dec. 9, 2005

(51) Int. Cl.
*G06F 7/00* (2006.01)
*G06F 17/30* (2006.01)

(52) U.S. Cl.
USPC .......................................... 707/713; 707/716

(58) Field of Classification Search
None
See application file for complete search history.

(56) References Cited

U.S. PATENT DOCUMENTS

| | | | |
|---|---|---|---|
| 5,802,515 A | 9/1998 | Adar et al. | |
| 6,415,368 B1 | 7/2002 | Glance et al. | |
| 6,470,269 B1 | 10/2002 | Adar et al. | |
| 6,493,702 B1 | 12/2002 | Adar et al. | |
| 6,591,257 B1 | 7/2003 | Martinka et al. | |
| 6,603,485 B2 | 8/2003 | Forman | |
| 6,631,451 B2 | 10/2003 | Glance et al. | |
| 6,701,333 B2 | 3/2004 | Suermondt et al. | |
| 6,728,692 B1 | 4/2004 | Martinka et al. | |
| 6,757,669 B1 | 6/2004 | Adar et al. | |
| 6,772,374 B2 | 8/2004 | Forman et al. | |
| 6,802,586 B2 | 10/2004 | Forman | |
| 6,823,323 B2 | 11/2004 | Forman et al. | |
| 6,915,284 B2 | 7/2005 | Adar et al. | |
| 6,947,936 B1 | 9/2005 | Suermondt et al. | |
| 7,136,876 B1 | 11/2006 | Adar | |
| 7,860,889 B1 * | 12/2010 | Martino et al. | 707/784 |
| 8,335,785 B2 | 12/2012 | Adar | |
| 2003/0018637 A1 | 1/2003 | Zhang et al. | |
| 2003/0050824 A1 | 3/2003 | Suermondt et al. | |
| 2003/0101024 A1 | 5/2003 | Adar et al. | |
| 2003/0120733 A1 | 6/2003 | Forman | |
| 2003/0138085 A1 | 7/2003 | Forman et al. | |
| 2003/0139901 A1 | 7/2003 | Forman et al. | |
| 2003/0145009 A1 | 7/2003 | Forman et al. | |
| 2003/0158855 A1 * | 8/2003 | Farnham et al. | 707/102 |
| 2003/0172067 A1 | 9/2003 | Adar et al. | |
| 2003/0174179 A1 | 9/2003 | Suermondt et al. | |
| 2003/0186243 A1 | 10/2003 | Adamic et al. | |
| 2003/0204581 A1 | 10/2003 | Adar et al. | |
| 2003/0204604 A1 | 10/2003 | Adar et al. | |
| 2003/0217106 A1 | 11/2003 | Adar et al. | |
| 2004/0024718 A1 | 2/2004 | Adar et al. | |
| 2004/0024719 A1 | 2/2004 | Adar et al. | |
| 2004/0024769 A1 | 2/2004 | Forman et al. | |
| 2004/0030882 A1 | 2/2004 | Forman | |
| 2004/0059697 A1 | 3/2004 | Forman | |

(Continued)

OTHER PUBLICATIONS www.netlingo.com/dictionary/l.php, log, downloaded on Apr. 21, 2014 (1 page).

*Primary Examiner* — Cheryl Lewis
*Assistant Examiner* — Raheem Hoffler

(57) ABSTRACT

Embodiments of the present invention are directed to a method for information management. In one embodiment, the method includes providing an organizational directory comprising hierarchical information regarding an organization and receiving relationship data including an association of a first person to a second person. The method also includes querying the organizational directory and the relationship data to identify a third person, wherein the third person is a member of the organization and identifying the third person comprises determining a path including the third person in an association network.

19 Claims, 5 Drawing Sheets

(56) References Cited

U.S. PATENT DOCUMENTS

| | | |
|---|---|---|
| 2004/0064464 A1 | 4/2004 | Forman et al. |
| 2004/0068499 A1 | 4/2004 | Adar et al. |
| 2004/0111431 A1* | 6/2004 | Zeller et al. ................ 707/104.1 |
| 2004/0148266 A1 | 7/2004 | Forman |
| 2004/0148267 A1 | 7/2004 | Forman |
| 2004/0158628 A1 | 8/2004 | Forman |
| 2004/0169695 A1 | 9/2004 | Forman |
| 2004/0172374 A1 | 9/2004 | Forman |
| 2004/0203645 A1 | 10/2004 | Forman et al. |
| 2005/0024826 A1 | 2/2005 | Bash et al. |
| 2005/0055373 A1 | 3/2005 | Forman |
| 2005/0102368 A1 | 5/2005 | Forman et al. |
| 2005/0131855 A1 | 6/2005 | Forman et al. |
| 2005/0165715 A1* | 7/2005 | Farnham et al. .................. 707/1 |
| 2005/0182780 A1 | 8/2005 | Forman et al. |
| 2005/0187664 A1 | 8/2005 | Bash et al. |
| 2005/0228789 A1 | 10/2005 | Fawcett et al. |
| 2005/0246337 A1 | 11/2005 | Forman et al. |
| 2005/0272087 A1 | 12/2005 | Adamic et al. |
| 2006/0009994 A1 | 1/2006 | Hogg et al. |
| 2006/0064436 A1* | 3/2006 | Fowler et al. ............. 707/104.1 |
| 2006/0136419 A1* | 6/2006 | Brydon et al. .................... 707/9 |
| 2007/0136429 A1 | 6/2007 | Fine |

* cited by examiner

SYSTEM AND METHOD FOR INFORMATION MANAGEMENT

BACKGROUND

This section is intended to introduce the reader to various aspects of art, which may be related to various aspects of the present invention that are described or claimed below. This discussion is believed to be helpful in providing the reader with background information to facilitate a better understanding of the various aspects of the present invention. Accordingly, it should be understood that these statements are to be read in this light, and not as admissions of prior art.

The success of many organizations, including businesses, depends upon collaboration between numerous members of the organization. This is particularly true for large corporations. For example, the successful introduction of a new product line by a large corporation will often depend on a number of disparate groups working together to design, manufacture, market, and distribute the products. In another corporate context, various representatives from different departments will meet to discuss an issue that affects their respective departments.

In many cases, a person at such a meeting is placed in an unfamiliar context, having to cross organizational boundaries and interact with people from multiple departments that could have different concerns, perspectives, or goals than the person is accustomed to considering. In some instances, the individual will not even know in which department or departments the meeting participants work. Further, even if the departments of the participants are known, the individual could lack a complete understanding of the structure of those departments or other information that would be helpful in tailoring a discussion or presentation to the participants. Still further, merely receiving the names of the participants and their respective departments does little, from the individual's perspective, to indicate the interrelationships between the participants or to learn about the personalities of the persons attending the meeting.

DETAILED DESCRIPTION OF SPECIFIC EMBODIMENTS

One or more exemplary embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present techniques address the information need highlighted above. In the case of corporate meetings, it could be advantageous for an employee entering such unfamiliar territory to gain an understanding of how the different participants interrelate. For instance, it would be helpful for a product engineer attending a meeting to know whether the participants are from a marketing department, a manufacturing department, some other department, or some combination thereof, and how the participants are related to one another. By way of further example, it would generally be desirable for an individual in the meeting to realize that all of the other participants are from the same department and report to the same manager, or that one participant in particular has managerial authority over the other participants. Such knowledge would facilitate more efficient discourse and allow the employee to tailor a presentation or statements in view of the perspective of the other participants. Additionally, it could also be helpful for an employee to learn that a participant works in the same department as someone else that the employee already knows, thereby providing supplemental context to aid in understanding the participant's role and goals.

Figure 1:
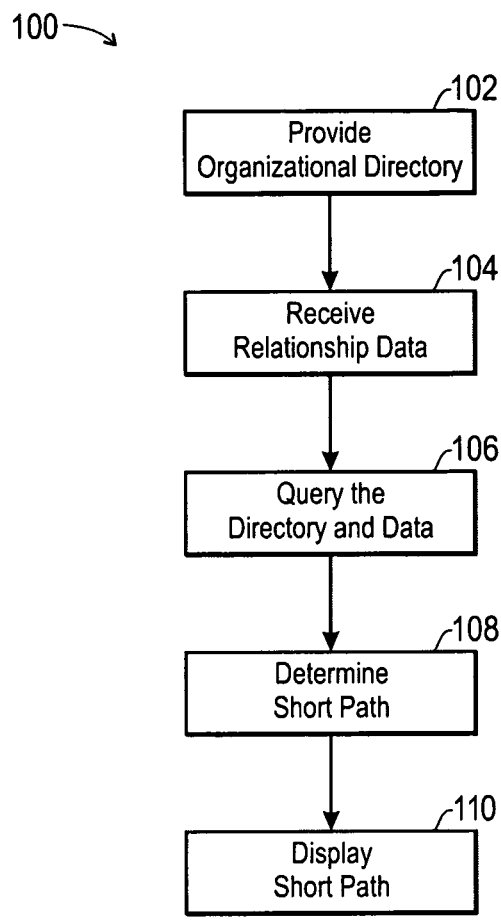
FIG. 1 is a flowchart of an exemplary process for information management in accordance with one embodiment of the present invention.

Turning now to the figures, FIG. 1 illustrates a process 100 for information management in accordance with one embodiment of the present invention. The process 100 includes providing an organizational directory (block 102). The organizational directory includes a plurality of persons associated with an organization and hierarchical connections between these persons. For example, in the instance of a corporation, an organizational directory for that corporation could include a president, one or more vice presidents, department heads, senior managers, and other employees, as well as management connections or management chains indicative of the hierarchical connections between these persons. It should be noted that although a corporate example is provided above, the present techniques are also applicable to other organizations, including professional associations, charities, clubs, or the like.

The process 100 also includes receiving relationship data (block 104). In the present embodiment, the relationship data includes a plurality of persons and a set of connections representing relationships between two or more of the persons. In one embodiment, the relationship data includes various contacts of an individual. These associated contacts can be entered manually, such as by a user; can be collected from an electronic address book; or can be collected in some other manner. Further, this relationship data can either be kept privately, such as on a user's computer, or kept in a central location.

In the present embodiment, each user has a distinct set of relationship data containing their own contacts. However, in a second embodiment, the relationship data includes not only a user's contacts, but also the contacts of other individuals. Thus, in the second embodiment the relationship data could also include the contacts of the user's contacts, contacts of the user's contacts, and so on. This centralized relationship data could be entered manually, gathered from the internet web or email logs of the organization, or collected in some other fashion. Further, in one embodiment, the centralization of relationship data for a plurality of persons in a central, public database adds further synergy by providing additional contacts and links from which to determine interrelationships and aiding the probability that additional associations will be discovered, as described in further detail below.

Process 100 further includes querying the organizational directory and relationship data (block 106) to identify a member of the organization. In the present embodiment, identifying the member includes determining a short path between the member and another person in an association network (block 108). As would be appreciated by one skilled in art, an association network includes a set of persons and associations or connections between individual persons of the set. For example, in the present embodiment, the association network includes one or more members listed in the organizational directory, one or more persons included in the relationship data, and various links between these persons. These links can include hierarchical connections, associative connections such as those contained in the relationship data, or some combination of these two. Short paths are discussed in greater detail below with reference to FIGS. 2 and 3. Once a short path is determined, the process 100 concludes with displaying the short path (block 110). It should also be noted that the instant process could be used to identify multiple search targets, as demonstrated in FIGS. 2 and 3.

Figure 2:
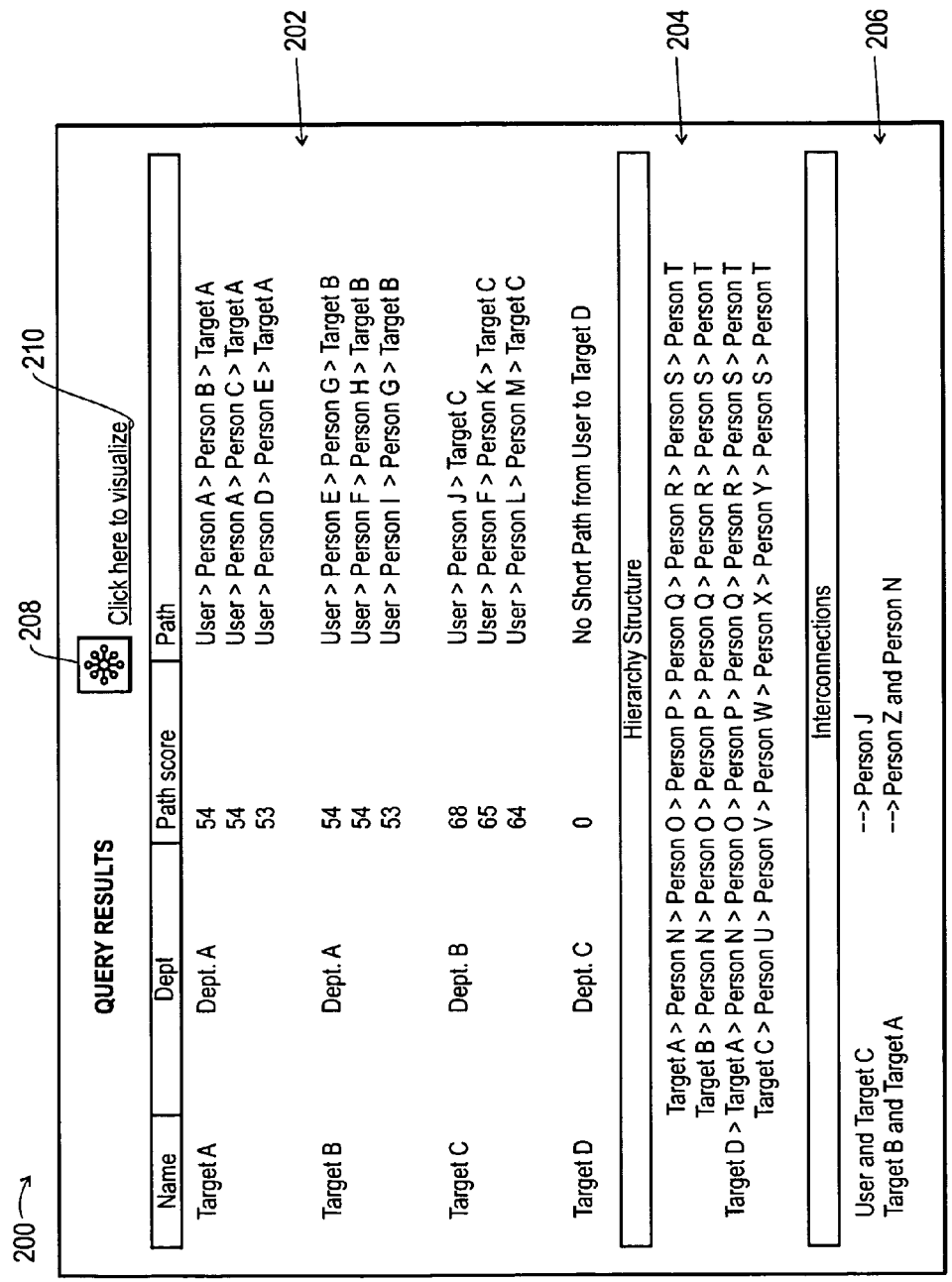
FIG. 2 is an exemplary display of output data generated in accordance with the process of FIG. 1 and one embodiment of the present invention.

An exemplary display 200 of output data generated by the process of FIG. 1 is provided in FIG. 2. In the presently illustrated embodiment, display 200 includes search results related to search targets, such as Targets A, B, C, and D. Particularly, display 200 has three sections or portions for displaying the results of a search or query. A first portion 202 of the display 200 provides various paths between a user and the search targets. Further, this section also includes the departments in which target persons work; various short paths between the user and the targets, which include various intermediate Persons A-M in addition to the user and the targets; as well as a relative scoring of each path. In one embodiment, the short paths can be scored based on the number of steps required to reach a search target from the user or other selected individual. However, in an alternate embodiment, the relative scoring additionally considers the strength of the links in the path, such as by assigning weights to links based on the degree of familiarity between the persons connected by the link.

The second portion 204 of display 200 provides hierarchical information related to the Targets A-D. Notably, portion 204 provides a management chain for each of the query targets. These management chains include Persons N-Y. Display 200 also includes third portion 206 which provides various interconnections between any persons in the group including the user and Targets A-D. As used herein, the term "interconnections" is employed to denote the existence of an intermediate contact common to two members of this group. For instance, in the present example, person J is a common contact for both the user and Target C, and Persons N and Z are contacts common to both Target A and Target B. In other words, the existence of an interconnection between two persons indicates the existence of a short path between these persons that includes only the interconnection and the two persons. The social network including persons contained in the organizational directory and relationship data can be visualized or graphed, as illustrated in FIG. 3, by selecting button 208 or link 210 of the display 200.

Figure 3:
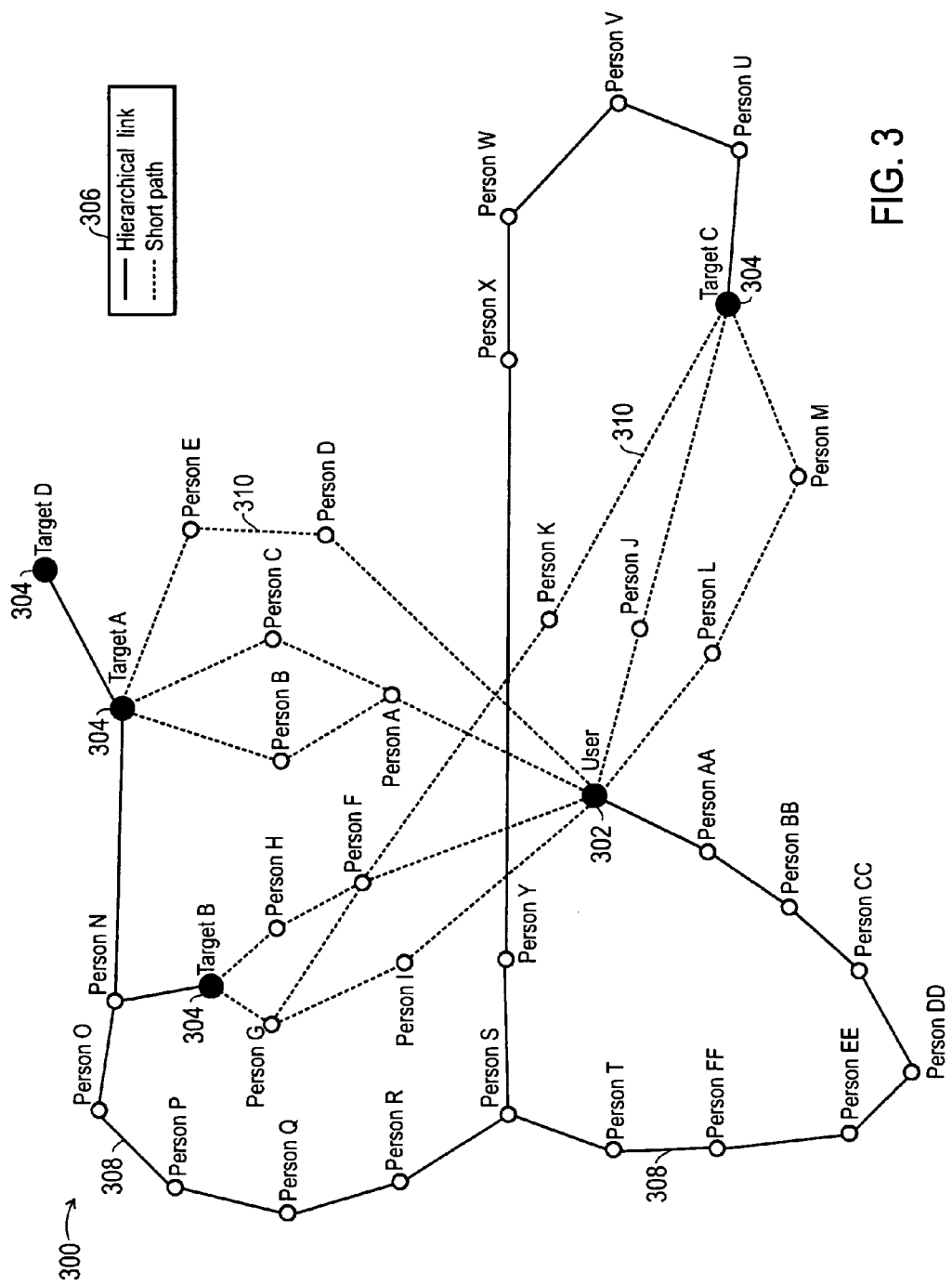
FIG. 3 is a visual representation of an association network generated in accordance with one embodiment of the present invention.

A visual representation 300 of the association network provided by the data of display 200 is illustrated in FIG. 3. As can be seen in the present illustration, various links between User 302, Targets 304, and intermediate Persons A-FF. As noted in legend 306, graph 300 includes hierarchical links 308 and short paths 310. For the sake of clarity, short paths in the present embodiment are those paths that can be established between the User 302 and Targets 304 on the basis of the relationship or contact data.

However, as will be appreciated by one skilled in the art, in other instances short paths can include links provided via the relationship data as well as those provided by the hierarchical structure. For instance, in an alternative embodiment, one could consider the path from User 302 to Target D, via Person A, Person D, and Target A, to be a short path. As can be seen in graph 300, this path, including both the hierarchical links and contact links, is considerably shorter than the path obtained through sole reliance on the organizational structure, in which the path would include Target A, Persons N-T, and Persons AA-FF.

It should also be noted that while various persons of any discovered short path could be members of the organization whose directory is queried by process 100, other persons in the short path could be external to the organization. Particularly, in one embodiment, the user or other identified starting point for the process is a member of the organization, as are one or more of the associated individuals in the relationship data. However, in alternative embodiments, the user or other individual identified as the origin for the short paths, the one or more associated contacts of the relationship data, or some combination thereof are external to the organization. The present techniques are thus broadly applicable regardless of whether the user or other identified starting point or any intermediate persons are members of the organization.

Figure 4:
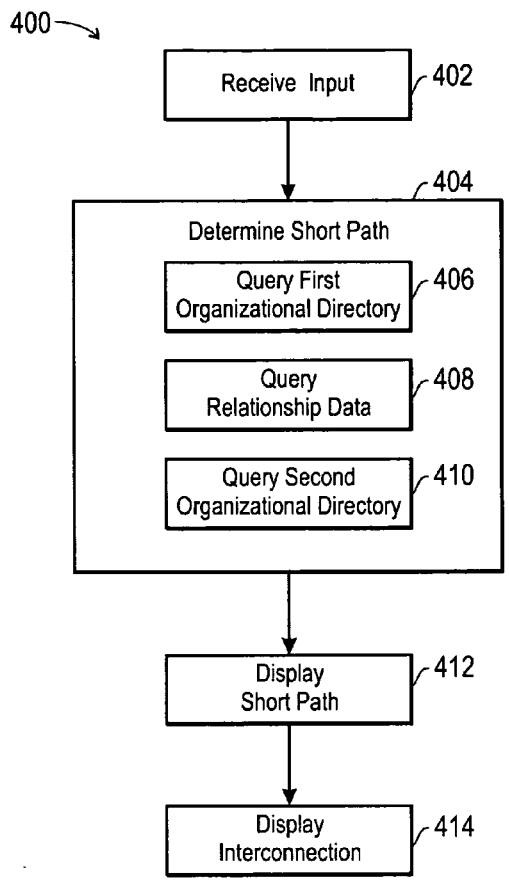
FIG. 4 is a flowchart illustrating an alternative embodiment for information management in accordance with the present techniques.

An alternative process 400 for information management is depicted in FIG. 4. Process 400 includes receiving input (block 402) from a user. In one embodiment, such input includes the name of the search target and the identity of the user. Process 400 also includes determining a short path between the user and the search target (block 404) in a social network constructed from one or more organizational directories and relationship data. Particularly, determining a short path includes querying a first organizational directory (block 406) and querying relationship data (block 408). As will be appreciated, such relationship data can include associations between the user and other persons, between the search target and other persons, and between members of the organization and other persons. Thus, in the present embodiment, a short path is discovered by determining that any of the user's contacts know the search target, that the user's contacts have their own contacts that know the search target, that this second group of contacts has further contacts that know the search target, or so on.

Once a short path including one or more of the user's contacts is discovered, it is displayed (block 412). The process 400 also includes displaying interconnections (block 414) between any of the user and the search targets. As will be appreciated, process 400 can be employed to determine short paths between a user and a single search target as well as a user and multiple search targets. In further embodiments, short paths between various search targets themselves can be determined. Additionally, as in process 100, the results of the query can be displayed in a graph illustrating various short paths and hierarchical links of the social network.

Figure 5:
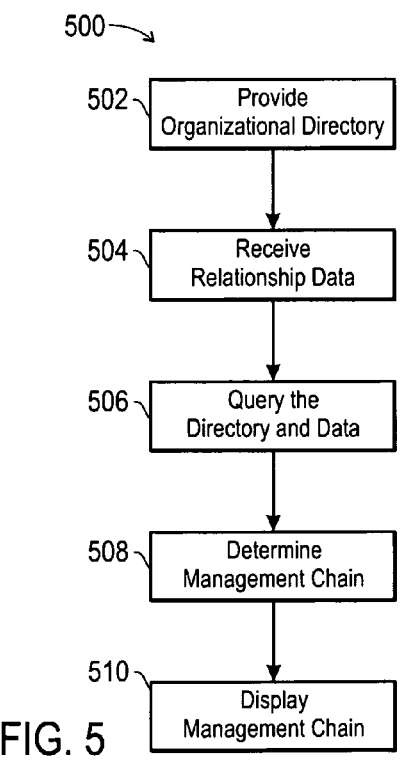
FIG. 5 is a flowchart depicting another exemplary method for information management in accordance with one embodiment of the present invention.

Another exemplary process 500 for information management is provided in FIG. 5. Notably, process 500 includes providing an organizational directory (block 502) containing an organization's hierarchical or management structure. Process 500 further includes receiving relationship data (block 504) containing associations between a user and the user's contacts. Such relationship data can be kept privately on a client machine, or stored centrally. In one embodiment, each potential user has a separate database of their respective contacts.

The process 500 also includes querying the organizational directory and relationship data (block 506) to identify a member of the organization. In particular, identifying such a member includes determining a management chain (block 508) containing both the search target and at least one of the user's contacts that is also a member of the organization. Once this chain is determined, it is displayed (block 510). In one embodiment, additional queries are performed for the user's contacts to determine how close these people are to the target individual in the management chain. Those contacts closer than some defined threshold from the target individual, such as four steps, are added to the displayed management chain.

Figure 6:
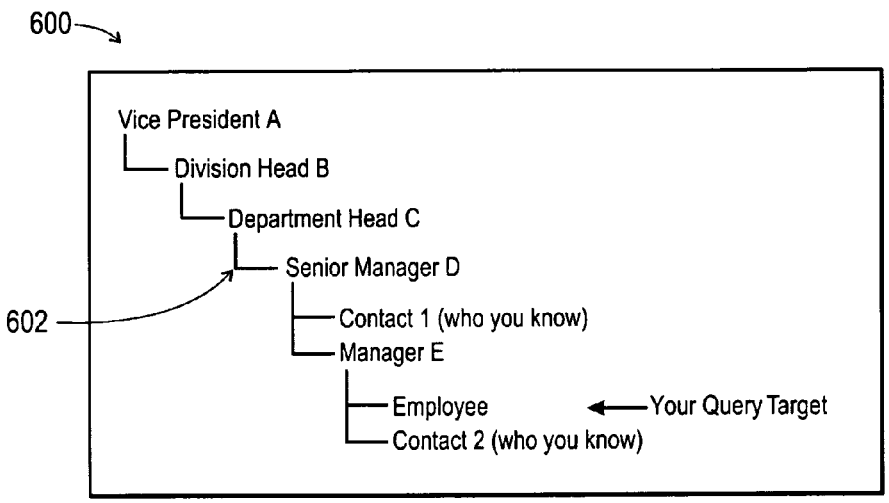
FIG. 6 represents exemplary output data in accordance with the method of FIG. 5 and one embodiment of the present invention.

An exemplary display 600 of such a management chain is provided in FIG. 6. For example, a user can search for a member of the organization. The process 500 queries the organizational directory and the user's relationship data to determine and display a management chain 602 containing both the member and one or more contacts of the user. In the instant case, display 600 denotes that both the searched-for member and a user contact, such as Contact 2, both report to the same Manager E. Further, display 600 also illustrates another of the user's contacts, such as Contact 1, reports to the same person, Senior Manager D, as Manager E. Further, this display 600 indicates a relationship between the user and any of the user's contacts to clearly identify the user's connection to the management chain. In an additional embodiment, a display of the management chain also includes how a contact is associated with a user.

Figure 7:
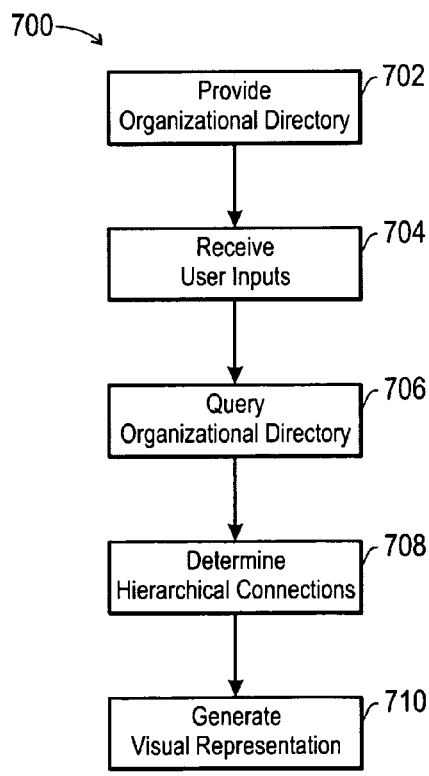
FIG. 7 illustrates yet another exemplary process for information management in accordance with one embodiment of the present invention.

Yet another alternative process 700 for information management is illustrated in FIG. 7. Process 700 includes providing an organizational directory (block 702) and receiving multiple search targets from a user (block 704). Process 700 queries the organizational directory (block 706), using the search terms, to identify multiple members of the organization and determine the hierarchical connections between some or all of the members (block 708). Once these connections are determined, a visual representation is generated (block 710) depicting the hierarchical connections between members of the organization. In one embodiment, the visual representation is a social network graph that includes some or all of the identified members.

As will be appreciated, one or more of the present embodiments can be implemented through use of a computer or other electronic device. The functional aspects of certain embodiments could be encoded as a computer program or application instructions onto a computer-usable medium. It should be noted that such a computer-usable medium could include, but is not limited to, a compact disc, a floppy disc, a flash memory device, a hard drive, random-access memory, other memory resources, and the like. Application instructions for implementing the disclosed functionality can be stored on one or more of these or other computer-usable media in full accordance with the present techniques.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A method for information management comprising:
providing an organizational directory comprising hierarchical information regarding an organization, the hierarchical information including an organizational structure having a plurality of hierarchical connections between members of the organization, the hierarchical connections including connections between members at different hierarchical levels of the organization, the different hierarchical levels including different management levels;
receiving, by at least one computer, relationship data derived at least from an email log and an internet web log, the relationship data including an association of a first person to a second person;
querying, by the at least one computer, the organizational directory and the relationship data to identify a third person, wherein the third person is a member of the organization and identifying the third person comprises determining a short path between the first person and the third person in an association network, the short path including the second person; and
causing, by the at least one computer, display of a result of the querying, the result including the short path between the first and third persons, attributes associated with the third person, and a score assigned to the short path.

2. The method of claim 1, wherein the second person is a member of the organization.

3. The method of claim 1, wherein the first person is a member of the organization.

4. The method of claim 1, wherein displaying the short path comprises generating a graphical representation of the short path and hierarchical connections between multiple persons including the first, second, and third persons.

5. The method of claim 1, further comprising querying the organizational directory and the relationship data to identify a plurality of persons including the third person, wherein identifying the plurality of persons comprises determining short paths between the first person and corresponding multiple persons of the plurality of persons in the association network.

6. The method of claim 5, wherein the multiple persons of the plurality of persons are members of the organization.

7. The method of claim 1, wherein the second person is a member of the organization and wherein the short path is a management chain including the second and third persons.

8. The method of claim 7, further comprising displaying the management chain.

9. The method of claim 8, wherein displaying the management chain comprises indicating that the second person is a manager of the first person.

10. The method of claim 1, wherein the received relationship data is derived from at least the email log, the internet web log, and an electronic address book.

11. A system for information management comprising:
one or more computers comprising at least one non-transitory computer-readable storage medium storing instructions executable in the one or more computers to:
provide an organizational directory comprising hierarchical information regarding an organization, the hierarchical information including an organizational structure having a plurality of hierarchical connections between members of the organization;
receive relationship data, the relationship data including an association of a first person to a second person, wherein the received relationship data is derived at least from an electronic address book, an email log, and an internet web log;

query the organizational directory and the relationship data to identify a third person, wherein the third person is a member of the organization, and identifying the third person comprises determining a short path between the first and third persons in an association network, the short path including the second person; and display a result of the querying, the result including the short path between the first and third persons, attributes associated with the third person, and a score assigned to the short path.

12. The system of claim 11, wherein the instructions are executable to further generate a graphical representation of the short path and hierarchical connections between multiple persons including the first and third persons.

13. The system of claim 11, wherein the hierarchical connections include connections between members at different hierarchical levels of the organization, the different hierarchical levels including different management levels.

14. A device comprising at least one non-transitory computer-readable storage medium having instructions stored therein, wherein the instructions, when executed cause one or more computers to:

provide an organizational directory comprising hierarchical information regarding an organization, the hierarchical information including an organizational structure having a plurality of hierarchical connections between members of the organization, the hierarchical connections including connections between members at different hierarchical levels of the organization, the different hierarchical levels including different management levels;

receive relationship data derived at least from an email log and an internet web log, the relationship data including an association of a first person to a second person;

query the organizational directory and the relationship data to identify a third person, wherein the third person is a member of the organization and identifying the third person comprises determining a short path between the first and third persons in an association network, the short path including the second person;

cause display of a result of the querying, the result including the short path between the first and third persons, attributes associated with the third person, and a score assigned to the short path.

15. The device of claim 14, wherein the instructions when executed cause the one or more computers to further generate a graphical representation of the short path and hierarchical connections between multiple persons including the first and third persons.

16. The device of claim 14, wherein the received relationship data is derived from at least the email log, the internet web log, and an electronic address book.

17. A method for information management comprising:
providing an organizational directory comprising hierarchical information regarding an organization, the hierarchical information including an organizational structure having a plurality of hierarchical connections between members of the organization;

receiving, by at least one computer, relationship data derived from an email log and an internet web log, the relationship data including an association of a first person to a second person;

querying, by the at least one computer, the organizational directory and the relationship data to identify a plurality of persons, wherein each of the plurality of persons is a member of the organization and identifying the plurality of persons comprises determining short paths between the first person and each of the plurality of persons in an association network, wherein at least one of the short paths includes the second person; and generating, by the at least one computer, a result of the querying, the result including:
a graphical representation of the short paths and hierarchical connections between multiple persons including the first person and the plurality of persons,
attributes associated with the plurality of persons person, and
scores assigned to the short paths.

18. A method for information management comprising:
receiving, by at least one computer, input from a first person, wherein the input is indicative of a second person belonging to a first organization and is indicative of the identity of the first person;

determining, by the at least one computer, a short path between the first and second persons in a social network, wherein determining the short path comprises:
querying a first organizational directory comprising hierarchical information pertaining to the first organization, the hierarchical information including an organizational structure having a plurality of hierarchical connections between members of the organization; and
querying relationship data, the relationship data comprising an association of the first person and a third person, wherein the short path between the first and second persons includes the third person, wherein querying the relationship data comprises querying relationship data derived at least from an electronic address book, an email log, and an internet web log; and causing, by the at least one computer, display of a result of the querying of the first organizational directory and of the relationship data, the result including the short path between the first and second persons, attributes associated with the second person, and a score assigned to the short path.

19. The method of claim 18, wherein determining the short path further comprises querying a second organizational directory, the second organizational directory comprising hierarchical information including an organizational structure having a plurality of hierarchical connections between members of a second organization.

* * * * *